(12) United States Patent
Moore et al.

(10) Patent No.: US 11,481,520 B2
(45) Date of Patent: Oct. 25, 2022

(54) SECURE IDENTIFICATION OF A PRINTED CIRCUIT BOARD

(71) Applicant: Hewlett Packard Enterprise Development LP, Houston, TX (US)

(72) Inventors: David A. Moore, Tomball, TX (US); Nigel Edwards, Bristol (GB); Jonathon Hughes, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 36 days.

(21) Appl. No.: 17/122,406

(22) Filed: Dec. 15, 2020

(65) Prior Publication Data
US 2022/0188462 A1    Jun. 16, 2022

(51) Int. Cl.
*G06F 21/73*      (2013.01)
*G06F 21/44*      (2013.01)
*H04L 9/32*       (2006.01)

(52) U.S. Cl.
CPC .............. *G06F 21/73* (2013.01); *G06F 21/44* (2013.01); *H04L 9/3236* (2013.01); *H04L 9/3263* (2013.01)

(58) Field of Classification Search
CPC ....... G06F 21/73; G06F 21/44; H04L 9/3236; H04L 9/3263
See application file for complete search history.

(56) References Cited

U.S. PATENT DOCUMENTS

| 8,188,866 | B2 | 5/2012 | Shachar |
| 9,092,712 | B2 | 7/2015 | Kroener et al. |
| 2016/0228716 | A1* | 8/2016 | Schmidt ................. A61N 1/362 |
| 2018/0097639 | A1* | 4/2018 | Gulati ..................... G06F 21/57 |
| 2019/0114434 | A1* | 4/2019 | Gong .................... G06F 21/602 |

FOREIGN PATENT DOCUMENTS

GB        2460071 A       11/2009

OTHER PUBLICATIONS

Conway. P., et al., Embedded RFID Tag inside PCB board to improve supply chain management (Research Paper), Jan. 2011, 5 Pgs.
Printed Circuit Boards with embedded UHF RFID Technology (Research Paper), Retrieved Sep. 17, 2020, 7 Pgs.
RFID PCB Tags (Webpage), Retrieved Sep. 17, 2020, 4 Pgs.

* cited by examiner

*Primary Examiner* — Nelson S. Giddins
(74) *Attorney, Agent, or Firm* — Hewlett Packard Enterprise Patent Department

(57) ABSTRACT

Examples described herein relate to a printed circuit assembly (PCA). The PCA includes a printed circuit board (PCB). The PCA further includes an identification device embedded within the PCB. The identification device stores identity information that uniquely identifies identification device and the PCB. Moreover, a PCB identifier defined using the identity information is also stored in a platform attestation file hosted locally within the PCA, on a remote server, or both locally within the PCA and on the remote server. Additionally, the PCA includes an authentication device disposed on the PCB, wherein the platform attestation file is cryptographically bound to the authentication device.

22 Claims, 5 Drawing Sheets

SECURE IDENTIFICATION OF A PRINTED CIRCUIT BOARD

BACKGROUND

Printed Circuit Boards (PCBs) are found generally in several electronic systems and form base plate for hosting electronic components including, but not limited to, integrated circuits (ICs), resistors, capacitors, inductors, transistors, and many more. The correct function and secure operation of the electronic systems depend on uncompromised production of the PCBs. Hostile tampering with PCB design files, or substitution of PCBs or the electronic components on the PCBs, may introduce hard to detect security threats for the electronic systems.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
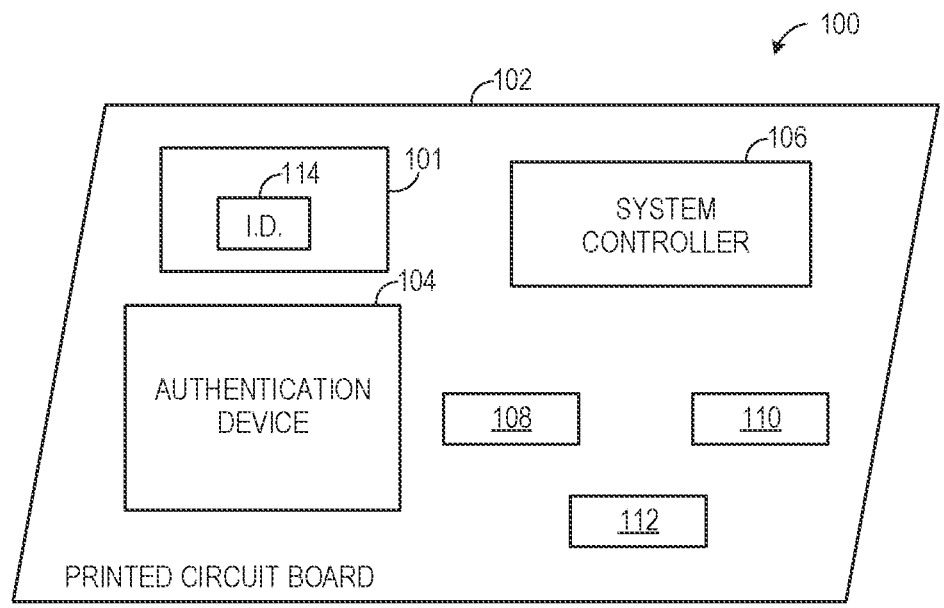
FIG. 1 depicts a printed circuit assembly (PCA), in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. As used herein, the term "includes" means includes but not limited to, the term "including" means including but not limited to. The term "based on" means based at least in part on.

Printed Circuit Boards (PCBs) are generally found in several electronic systems and form base plate for hosting electronic components including, but not limited to, integrated circuits (lCs), resistors, capacitors, inductors, transistors, and many more. The correct function and secure operation of the electronic systems depend on uncompromised production of the PCBs. Hostile tampering with PCB design files, or substitution of PCBs or the electronic components disposed on the PCBs, may introduce hard to detect security threats for the electronic systems that use these PCBs. Moreover, in some instances, the PCBs used in electronic systems are not uniquely identified until they have been assembled and tested into a finished Printed Circuit Assemblies (PCAs). Typically, once a printed circuit assembly (PCA) is formed, a printed label identifying the PCA is attached on the PCA. In some instances, the PCBs are also marked with one or more labels via a non-unique silk screen or copper etch markings including alphabetic letters, numbers, symbols, or combinations thereof. Such externally applied physical markings and/or labels can easily be altered by a determined adversary. Moreover, such labels do not have any particular security feature and are therefore susceptible to compromise. Certain supply chain security efforts rely on strict administrative control of "Work In Progress" (WIP) materials (e.g., PCBs and PCAs), but without a unique and tamper evident PCB identity. Accordingly it may be difficult to guarantee against substitution and/or tampering by the determined adversaries, especially before serialization labels have been attached to the PCA.

To that end, a PCA including a tamper evident printed circuit board (PCB) is presented, in accordance with the aspects of the present disclosure. In some examples, the PCB is capable of being verified at any time in during lifecycle of the PCA, up-to secure disposal at end of life. In particular, the aspects presented in the present disclosure allow unique identity traceability for the PCB all the way back to its fabrication. To effect such traceability, the PCB of the present PCA includes an identification device (e.g., an RFID tag or any suitable device). In particular, the identification device may be embedded within the PCB. The identification device stores identity information that uniquely identifies identification device and the PCB. In some examples, the identity information may establish a unique PCB identity at initial production, extending per board traceability much earner in the manufacturing process.

In order to further enhance the authenticity of such information (e.g., the identity information), a PCB identifier (PCB ID) defined using the identity information may also be stored in a platform attestation file (e.g., a platform certificate) stored locally in the PCA, on a remote server, or both in the PCA and on the remote server external to the PCA. In some examples, the platform attestation file may be cryptographically bound to an authentication device (e.g., a security co-processor) disposed on the PCB. In some examples, the PCB ID may be defined using the identity information stored in the identification device. In one example, the PCB ID may be same as the identity information stored in the identification device. In another example, the PCB ID may be a unique combination of one or more of numbers, alphabets, or symbols generated based on the identification information stored in the identification device. In particular, the PCB ID stored in the platform certificate provides a verifiable linkage between the physical PCB and a digital identity of the PCA hosting the PCB. This additional traceability is a powerful tool against hardware tampering threats. Accordingly, it may be established that the PCB and any electronic system having such PCB is genuine, uncompromised, and secure throughout its operational life.

In some examples, auxiliary identity data including, but not limited to, reference images, production records, component marking information, or production test results corresponding to a genuine PCB and/or a genuine PCA may also be stored in the remote server or locally on the PCA along with the platform attestation file. The PCA under check may also be verified against such auxiliary identity data. For example, in addition to the verification of the identity information, the PCB 102 may also be verified against one or more of the auxiliary identity data retrieved from the remote server to confirm that the PCB 102 is genuine or a tampered (or fake) one.

Referring now to the drawings, in FIG. 1, a printed circuit assembly (PCA) 100 is presented in accordance with one example. One or more PCAs such as the PCA 100, when assembled together in a specific arrangement, may form an electronic system such as, but not limited to, a server, a storage device, a network switch, a router, a mobile communication device, a desktop computer, a portable computer, a networked resource enclosure, or a WLAN access point. In some examples, the PCA 100 may represent a device including a PCB 102 and several electronic components including, but not limited to, an authentication device 104 (described later), a system controller 106 (described later), and one or more of other electronic components 108, 110, 112 (hereinafter collectively referred to as electronic components 104-112) disposed on the PCB 102. It is to be noted that, in some example implementations of the RCA 100, some or all of the electronic components 104-112 may be disposed on the PCB 102. Examples of the other electronic components 108-112 may include, but are not limited to, resistors, diodes, inductors, capacitors, transistors, switches, indicators, integrated circuits (ICs), processing resources (e.g., processors, controller, etc.), or storage devices (e.g., memory modules such as random access memory (RAM) module, read-only memory (ROM), etc.).

The PCB 102 may be a rigid or flexible flat monolithic board or a flat laminated composite made from non-conductive substrate materials. Example substrate materials that are used to make the PCB 102 may include, but are not limited to, FR-2, FR-4 epoxy laminate, polyimide laminates, Teflon laminates, and the like. The PCB 102 may mechanically support and electrically connect the electronic components 104-112 using conductive tracks, pads and other features etched from one or more sheet layers of conductive material (e.g., copper) laminated onto and/or between sheet layers of a non-conductive substrate. The electronic components 104-112 may either be permanently attached (e.g., soldered) or be removably attached to the PCA 100. The term "removably attached" or "removably coupled" as used herein may refer to a coupling arrangement between two components that allows the coupled components to be decoupled and coupled again when desired. In some implementations, certain electronic components, such as resistors, diodes, inductors, capacitors, transistors, ICs, sockets to mount ICs (hereinafter referred to as IC sockets), may be permanently soldered to the PCB 102. However, certain electronic components, for example, memory modules such as random access memory (RAM) chips may be removably attached on the PCB 102 on respective IC sockets. Although not shown in FIG. 1, in order to mechanically support the electronic components 104-112 and/or to establish electrical connection among the one or more of the electronic components 104-112, the PCB 102 may include one or more conductive traces, pads, through-holes, vias, mounting holes, and the like.

The authentication device 104 may be disposed on the PCB 102 and is responsible for assuring integrity of the PCA 100 by ensuring that the PCA 100 behave as intended regardless of an operating system running on the PCA 100. In one example, the authentication device 104 may be soldered to the PCB 102 during the assembly of the FCA 100 (see FIG. 4). The authentication device 104 may establish a digital identity of the PCA 100 and enable various security features such as, but not limited to, encryption, password protection to protect keys or data, or digital rights management for the PCA 100 or an electronic system employing the PCA 100. In particular, the authentication device 104 may have unique digital identity for a given PCA, for example, the PCA 100. In some examples, the unique digital identity of the authentication device 104 may be represented by a unique private key (hereinafter referred to as a private key) that is permanently embedded in the authentication device 104 and is not shared outside the authentication device 104. A public key corresponding to the private key of the authentication device 104 may be distributed/shared outside the authentication device 104. The private key may be uniquely identifiable via a serial number of a certificate associated with the private key (hereinafter referred to as a private key certificate).

In certain examples, the private key may be stored outside (e.g., on an external storage such as a server, a storage device, or any storage media on the PCA 100, not shown) the authentication device 104, provided it is encrypted with an encryption key which is securely embedded in the authentication device 104 and cannot leave the authentication device 104. In this way, such storage of the private key in the external storage may save memory in the authentication device 104. The private key stored on the external storage may be loaded into the authentication device 104 on demand. The private key may then be decrypted within the authentication device 104. An attacker may delete the private key from the external storage, but cannot recover the private key. Consequently, the attacker can't authenticate with the private key stored outside the authentication device 104, or use it for any encryption or decryption.

In one implementation, the authentication device 104 may be a security co-processor. One example of the security co-processor that may be used as the authentication device 104 may be a Trusted Platform Module (TPM). To provide reliable operation of a platform for an end-user, a platform manufacturer (e.g., a manufacturer of the PCA 100) needs to enable the end-user to verify the authenticity of a platform (e.g., the PCA 100, the PCB 102, and/or electronic system including the PCA 100). In some examples, the security co-processor may be consistent with the Trusted Platform Module (TPM) criteria conceived by Trusted Computing Group (TOG) which is an example security solution. The TPM may be used to detect if a device of the platform is counterfeit, e.g., made by an unauthorized party or made in an unauthorized manner. The TPM may be implemented as a security co-processor chip that conforms to TOG specifications. In some examples, the security co-processor (e.g., a TPM) may include device unique data such as a private endorsement key. In some examples, a private endorsement key is a cryptographic key that is not visible outside of the security co-processor. The security co-processor can use the endorsement key for encryption purposes. In some examples, an operating system (OS) running on a processor in an electronic system equipped with the PCA 100 may ask the security co-processor to perform cryptographic operations such as sign, decrypt, encrypt. In some examples, a public endorsement key may also be provided by the security co-processor which may be distributed/shared outside the security co-processor. The public endorsement key may be used to encrypt data.

In some examples, an authentication of the electronic system may be performed by the OS or a basic input/output system (BIOS) by reading serial number information for the electronic system, one or more electronic components 106-112, the PCB 102, and/or the PCA 100. In one example, these serial numbers may be compared with the serial number information stored in a platform attestation file (e.g., a platform certificate) by a verifying entity outside of the electronic device. Additional details regarding the platform attestation file are described in conjunction with FIG. 2. The verifying entity may also check the validity of the platform certificate to determine if the platform certificate is it signed by a trusted certificate authority and it is for the security co-processor inside the electronic device. Such verification of the platform certificate may involve interaction of the verifying entity with the security co-processor to verify the private endorsement key. In some examples, possession of the private endorsement key can be verified indirectly by using the private endorsement key to decrypt a value that has been encrypted with a public endorsement key.

In certain other examples, some electronic systems may include a security co-processor having a public private key pair with respective certificates. In such an implementation of the security co-processor having the public private key pair with respective certificates, the OS and/or BIOS may authenticate the public private key pair and verify the component certificates (e.g., the platform certificate).

For illustration purposes, in certain examples, the authentication device 104 is described as being the security co-processor chip. However, in some other implementations of the PCA 100, the authentication device 104 may be implemented as being a firmware and/or a hardware. For example, the system controller 106 soldered to the PCB 102 may also be configured to implement one or more functionalities of the authentication device 104. In some examples, the security co-processor may be designed to facilitate hardware-based, security-related functions for the PCA 100. In particular, the security co-processor chip may be a secure crypto-processor that is designed to carry out cryptographic operations on the PCA 100 and include multiple physical security mechanisms to make it tamper resistant. Although the authentication device 104 is shown as a hardware element in the example of FIG. 1, in some other examples, the authentication device 104 may also be implemented as a software, firmware, or a combination of hardware, firmware, and software. For example, functionalities of the security co-processor chip may be implemented as a discrete security co-processor (e.g., a dedicated security co-processor chip), an integrated security co-processor (e.g., security co-processor functionalities integrated into other type of ICs), a firmware security co-processor (e.g., embedding security co-processor functionalities into a firmware), a software security co-processor (e.g., embedding security co-processor functionalities into software), or a hypervisor security co-processor (e.g., embedding security co-processor functionalities into a hypervisor).

Typically, a security co-processor chip may have a unique digital identity established via a corresponding unique private endorsement key which is a special purpose Rivest-Shamir-Adleman (RSA) key. The private endorsement key is an encryption key that is permanently embedded in the security co-processor chip, generally at the time of manufacture of the security co-processor chip and is not visible outside the security co-processor chip. Generally, the private endorsement key is never released outside of the security co-processor chip. The public endorsement key is used to recognize that the security co-processor chip is genuine. The private endorsement key may be used to encrypt data. Possession of the private endorsement key by the security co-processor chip may be proved by using the private endorsement key to decrypt a value that has been encrypted with the public endorsement key. In some examples, the private endorsement key may be used to bootstrap trust to issue certificates for additional keys, for example, an attestation identity key (AIK) or IDevID, which can be used for signing data. In some examples, the private endorsement key that is embedded into the security co-processor chip is uniquely identified by a serial number of a certificate associated with the private endorsement key (hereinafter referred to as an endorsement key certificate).

In certain examples, the private endorsement key may be stored outside (e.g., on an external storage such as a server, a storage device, or any storage media on the PCA 100, not shown) the security co-processor, provided it is encrypted with an encryption key which is securely embedded in the security co-processor and cannot leave the security co-processor. In this way, such an external storage of the private endorsement key may save memory in the security co-processor. The private endorsement key on the external storage may be loaded into the security co-processor on demand. The private endorsement key may then be decrypted within the security co-processor. An attacker may delete the private endorsement key from the external storage, but cannot recover the private endorsement key. Consequently, the attacker can't authenticate with the private endorsement key stored outside the security co-processor, or use it for any encryption or decryption.

Referring again to the PCB 102, in accordance with the aspects of the present disclosure, the PCB 102 may have embedded therein an identification device 114 that can establish a unique identity for the PCB 102. In sharp contrast, as previously noted, a traditional PCA and/or PCB is generally identified via use of externally applied markings and/or labels describing identity (e.g., serial number and/or product details) of the PCB or the PCA. Such externally applied physical markings and labels generally do not have any particular security feature and can easily be altered by a determined adversary resulting in hard to detect security threats, in some instances. Examples of the identification device 114 embedded into the PCB 102 may include, but are not limited to, a radio frequency identification (RFID) tag, a memory element, a near-field communication (NFC) device, or an integrated circuit (IC) chip with storage and communication capabilities (e.g., similar to IC chips used in chip credit cards).

In accordance with the aspects of the present disclosure, the identification device 114 may be embedded within the PCB 102. The identification device 114 is disposed in a cavity (not shown) formed in the PCB 102. In some examples, the identification device 114 may be embedded within the PCB 102 such that the identification device 114 remains electrically isolated or air-gapped from the electronic components 104-112 disposed on the PCB 102. More particularly, in some examples, the identification device 114 may be embedded within the PCB 102 such that content stored in the identification device 114 cannot be altered or a physical access to the identification device 114 is inhibited. Such placement of the identification device 114 ensures that the content stored in the identification device 114 cannot be corrupted by any hostile attack to the PCB 102, while allowing an external reader in close proximity of the PCB 102 near a portion 101 to verify the content of the identification device 114 at any time. An example placement of the identification device 114 within the portion 101 of the PCB 102 is described in conjunction with FIG. 5.

In accordance with the aspects of the present disclosure, the identification device 114 may be embedded within the PCB 102 during the manufacturing of the PCB 102 itself. This is different from the traditional implementations where a label or a marking is applied on a PCB after the PCB or RCA is manufactured. Additional details regarding a timeline of embedding the identification device 114 is described in conjunction with FIG. 4. In some examples, the identification device 114 may store identity information that uniquely identifies identification device 114 and the PCB 102. The identity information may be a unique combination of one or more of numbers, alphabets, or symbols. In the description hereinafter, the identity information is described as being a combination of numbers from 0 to 9 that uniquely identifies the identification device 114 and the PCB 102. Additional details regarding the identification device 114 and the identity information are described in conjunction with FIG. 6.

In some examples, the identification device 114 may be programmed or configured with the identity information prior to embedding the identification device 114 in the PCB 102. In certain examples, the identification device 114 may be programmed or configured with the identity information immediately after the PCB 102 is fabricated but before disposing the electronic components 104-112. In certain other examples, at least a portion of information (e.g., a unique identifier of the identification device 114) defining the identity information may be preconfigured in the identification device 114 at the time of manufacturing of the identification device 114 by the manufacturer of the identification device 114, whereas a remaining information (e.g., information that uniquely identifies the PCB 102, described later) that defines the identity information may be stored in the identification device 114 during the manufacturing the PCB 102.

At any time after the PCB 102 is fabricated, the identification device 114 may be scanned using a suitable scanner or reader to read the identity information stored in the identification device 114. For example, if the identification device 114 is an RFID tag, the RFID tag may be scanned using an RFID scanner by placing the RFID scanner near an area (e.g., the portion 101) of the PCB 102 containing the RFID tag. In some examples, the identity information that is read from the identification device 114 may be verified by comparing it with a reference identity information provided in a product documentation or retrieved from producer's/manufactures' database.

To further strengthen the authenticity of the identity information stored in the identification device 114, in some examples, the identity information is further secured by the authentication device 104 by linking the identity information with the digital identity established by the authentication device 104. For instance, during the manufacturing of the PCA 100, after the PCB 102 is fabricated with the embedded identification device 114, the authentication device 104 and/or several other electronic components, e.g., one or more of the electronic components 106-112, may be disposed on the PCB 102. Once the authentication device 104 (e.g., the security co-processor chip) is soldered to the PCB 102 or once the authentication device 104 to be disposed on the PCB 102 is identified, a platform attestation file (e.g., a platform certificate) may be created for the PCA 100. In some examples, the platform attestation file may be created by a company assembling the PCA 100 or by an independent authority. The platform attestation file may include several information about the PCA 100 and/or a final product (e.g., electronic system) including the PCA 100.

Figure 2:
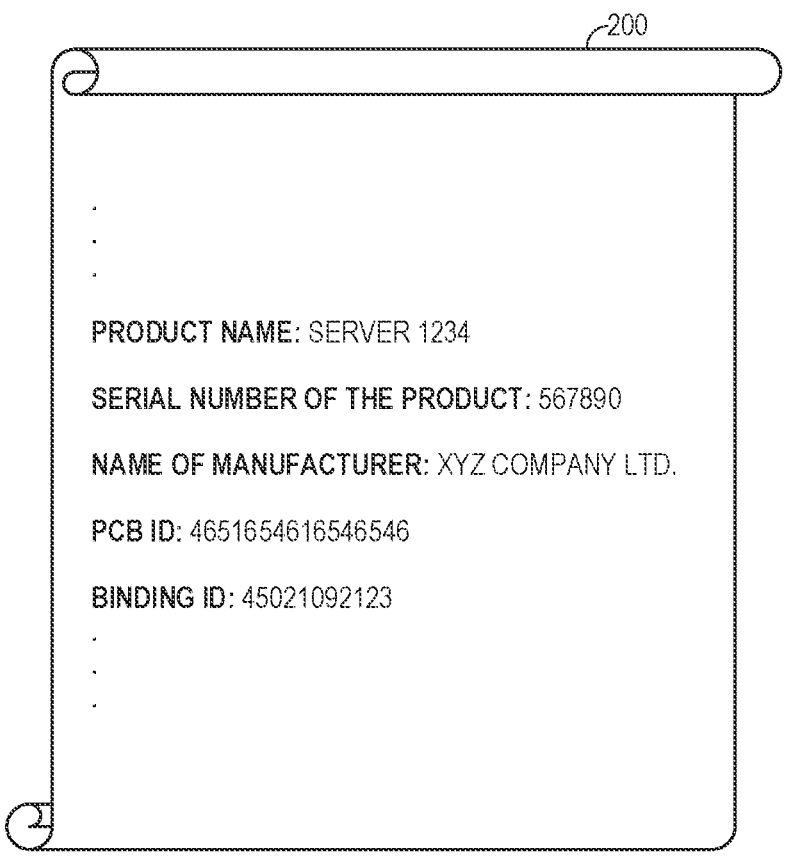
FIG. 2 depicts an example platform attestation file, in accordance with one example.

An example platform attestation file is depicted in FIG. 2. Referring quickly to FIG. 2, an example platform attestation file 200 is depicted which may include various additional identity data such as, but not limited to, one or more of a product name (e.g., a server 1234), a serial number of the product (e.g., 567890), or a name of manufacturer (e.g., XYZ company ltd) for the PCA 100. Additionally, in some examples, a PCB ID generated based on the identity information that uniquely identifies the identification device 114 and the PCB 102 may also be stored in the platform attestation file 200. In some examples, the PCB ID stored in the platform attestation file 200 may be same as the identity information stored in the identification device 114. In some examples, the PCB ID may be a unique combination of one or more of numbers, alphabets, or symbols generated based on the identification information stored in the identification device 114. For example, in FIG. 2, the platform attestation file 200 is shown to include the PCB ID having an example value of "4651654616546546".

Moreover, the platform attestation file 200 may be linked to the digital identity of the authentication device 104. To establish such secure link between the platform attestation file 200 and the authentication device 104, the platform attestation file 200 may be cryptographically bound to the authentication device 104, In some examples, a cryptographic binding of the platform attestation file 200 with the authentication device 104 may be achieved by storing a reference of the private key (e.g., the serial number of the private key certificate) of the authentication device 104 into the platform attestation file 200. In an example where the authentication device 104 is implemented as a security co-processor chip embedded with a unique private endorsement key, the cryptographic binding of the platform attestation file 200 (e.g., a platform certificate) with the security co-processor chip may be achieved by storing a serial number of the private endorsement key certificate of the security co-processor chip into the platform attestation file 200. In the example of FIG. 2, the platform attestation file 200 is shown to include a serial number of the private endorsement key of the security co-processor chip (e.g., a value 45021092123) as a binding ID. Integration of this identity information into the platform attestation file (e.g., the platform certificate) that is cryptographically bound to the authentication device 104 can further enhance security, by providing a verifiable linkage between the RCA 100 and its digital identity established by the authentication device 104.

Once generated, the platform attestation file may be stored locally within the PCA 100, on a remote server (not shown in FIG. 1, see FIG. 3), or both locally within the RCA 100 and on the remote server external to the RCA 100. In some examples, the platform attestation file may be stored locally on the system controller 106 or on any electronic component capable of storing information, without limiting the scope of the examples described herein. For the purpose of illustration in the description hereafter, the platform attestation file is described as being stored locally on the system controller 106. The system controller 106 may also be referred to as a baseboard management controller (BMC), in some examples. The system controller 106 may be implemented using a separate processing resource (e.g., a processor, not shown) from the main processing resource (not shown) executing a host OS, if any on the PCA 100. In some examples, the system controller 106 may provide so-called "lights-out" functionality for the RCA 100. For example, the lights-out functionality may allow a user (e.g., an administrator, a customer, or a service personnel) to perform management operations on the PCA 100 or an electronic system having the PCA 100 even if the host OS is not installed or not functional. Moreover, in one example, the system controller 106 may run on an auxiliary power, thus the RCA 100 need not be powered on to an ON-state where control of the PCA 100 is handed over to the host OS after boot. In some examples, the system controller 106 may also have management capabilities for sub-systems (e.g., cooling system) of the RCA 100.

Further, in certain examples, the system controller 106 may provide so-called "out-of-band" (OOB) services, such as remote console access, remote reboot and power management functionality, monitoring health of the RCA 100, access to system logs, and the like. The term OOB services as used herein may refer to any service provided by the system controller 106 execution of which does not interfere with instructions or workloads running on the main processing resource of the PCA 100. In some examples, the system controller 106 may include an interface (also referred to as a management channel) such as a network interface, and/or serial interface to enable communication with the system controller 106. For example, the system controller 106 may provide remote management access (e.g., system console access) from a remote system such as a remote computer system regardless of whether the RCA 100 is powered on, whether a primary subsystem hardware of the PCA 100 is functioning, or whether the host OS is operating or even installed. The user may be able to access various functionalities offered by the system controller 106 by accessing a web-console from the remote computing system (not shown), as well.

In some examples, the system controller 106 may include a storage media such as, but not limited to, an Electrically Erasable Programmable Read-Only Memory (EEPROM), a storage drive, a flash memory, a Compact Disc Read Only Memory (CD-ROM), and the like. In one example, the system controller 106 may store the platform attestation file (e.g., the platform attestation file 200) in such storage media. Additionally or alternatively, the platform attestation file may be stored on a remote server (see FIG. 3). The remote server may be any computing system separate from the PCA 100 and is accessible by the user directly or over a network. Examples of the computing systems that may be used as the remote server may include, but are not limited to, a server, a storage device, a network switch, a router, a mobile communication device, a desktop computer, a portable computer, a computing system resource enclosure, or a WLAN access point. The server may be a blade server, for example. The storage device may be a storage blade, for example. Further, in some examples, the computing system enclosure may be a blade enclosure housing one or more blades (e.g., blade servers, storage blades, etc.), In some examples, the platform attestation file may be hosted both locally within the PCA 100 (e.g., on the system controller 106) and on the remote server. Moreover, in certain examples, the remote server may also store an auxiliary identity data corresponding to the PCB 102. Example of the auxiliary identity data stored on the remote server may include, but are not limited to, one or more of reference images, production records, component marking information, or production test results, etc., corresponding to a genuine PCB. The PCB 102 may also be verified against one or more of the auxiliary identity data to establish that the PCB 102 is genuine or a tampered (or fake) one.

Figure 3:
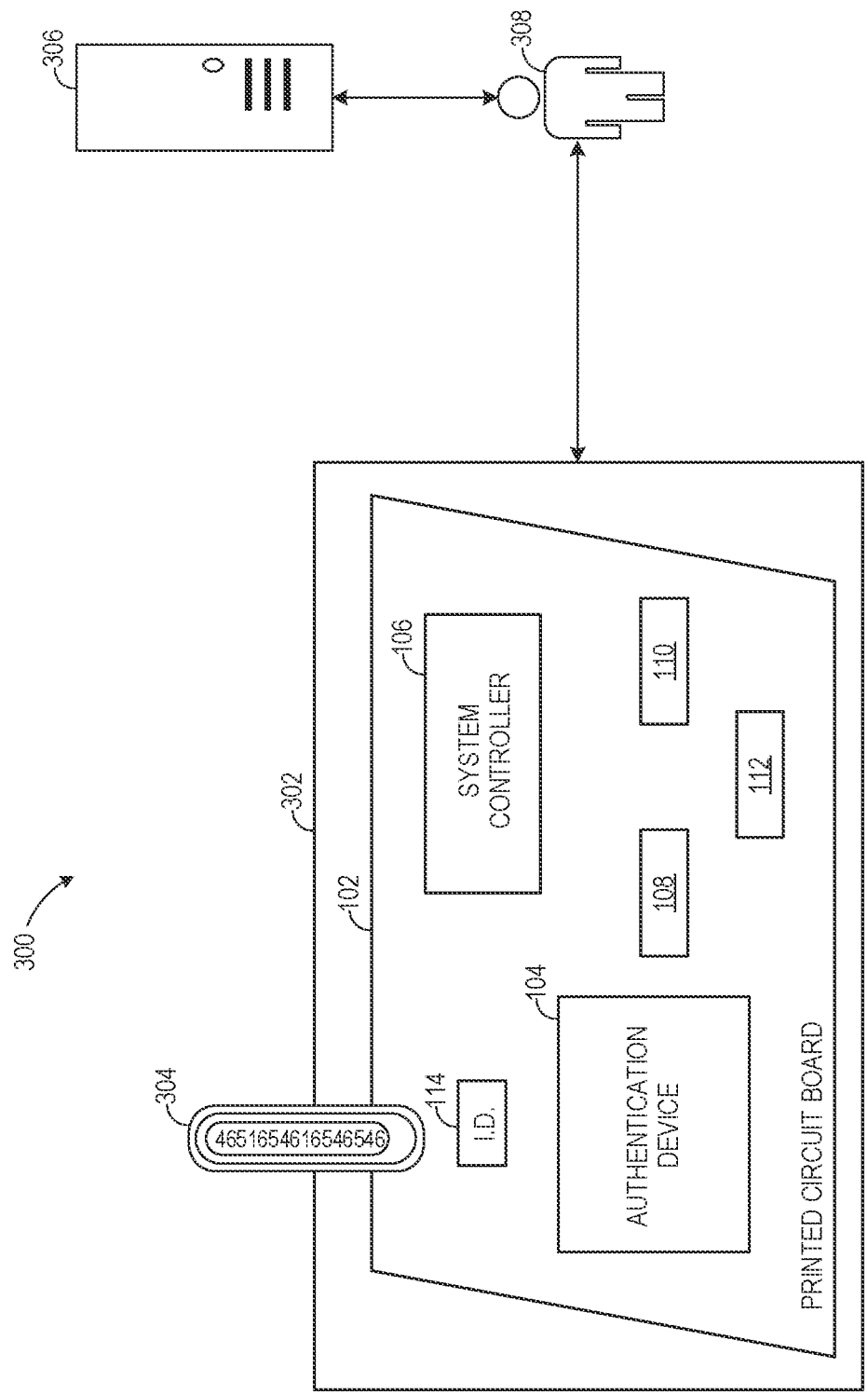
FIG. 3 depicts an example ecosystem enabling verification of an authenticity of the PCB 102, in accordance with an example.

Referring now to FIG. 3, an example ecosystem 300 enabling verification of an authenticity of the PCB 102 is presented. The ecosystem 300 may include an electronic system 302 including a PCA such as the PCA 100, a reader 304, and a remote server 306. Examples of the electronic system 302 may include, but are not limited to, a server, a storage device, a network switch, a router, a mobile communication device, a desktop computer, a portable computer, a computing system resource enclosure, or a WLAN access point. The server may be a blade server, for example. In some examples, the electronic system 302 may include, one or more PCAs, for example, the 100 as depicted in FIG. 3. Additional details regarding the PCA 100 is not repeated herein for the sake of brevity. Further, in some examples, the reader 304 may be any suitable device capable of reading content (e.g., the identity information) stored in the identification device 114. For example, if the identification device 114 is an RFID tag, the reader 304 may be an RFID scanner that can read the content stored in the RFID tag. Similarly, if the identification device 114 is a memory element (e.g., a memory chip), the reader 304 may include suitable electronics capable of reading the memory element via one or more contact terminals exposed by the identification device 114.

The user 308 may be any person who wants to verify that the PCB 102 employed in the electronic system 302 is genuine. For example, the user 308 may include one or more of an administrator of the electronic system 302, a service personnel, or a customer who uses the electronic system 302. To verify that the PCB 102 employed in the electronic system 302 is genuine, the user 308 may gain a physical access to the PCA 100 by opening a housing of the electronic system 302. The user 308 may then hold the reader 304 proximate to a location on the PCB 102 where the identification device 114 is embedded. Alternatively, in some examples, the user 308 may connect the reader 304 to the contact terminals exposed by the identification device 114 on the PCB 102. In some examples, the location on the PCB 102 where the identification device 114 is embedded may be suitably marked (e.g., using text, symbols, circling the location, etc.) to indicate the user 308 where to place the reader 304. Upon scanning the identification device 114, the user 308 may know the identity information stored in the identification device 114 that uniquely identifies the PCB 102 and the identification device 114. In some examples, the reader 304 may include a display the identity information read from the PCB 102. In certain examples, the reader 304 may include a suitable electronics to communicate the identity information that is read from the PCB 102 to any other electronic device, for example, a smart phone or a computer of the user 308 using one or more of a test message, email, multimedia message, transaction over a communication network, or the like.

The user 308 may then access the platform attestation file from the remote server 306 and/or from the PCA 100 (e.g., by accessing the system controller 106), where the platform attestation file is linked to the digital identity of the PCA 100). As previously noted, the platform attestation file is cryptographically bound to the authentication device 104 that ensures that the platform attestation file is genuine as it contains, for example, the serial number of the private endorsement key certificate of the authentication device 104 as the binding ID. In such an implementation of the platform attestation file, in some examples, the authenticity of the platform attestation file may be established upon verifying that the authentication device 104 is in the possession of the private endorsement key having the private endorsement key certificate's serial number that matches with the binding ID stored in the platform attestation file.

In an alternative implementation, the platform attestation file may be cryptographically bound to the authentication device 104 by storing one or more of the IDevID key, a reference to the IDevID key, the AIK, or reference to the AIK of the authentication device 104 into the platform attestation file. In yet another implementation, the platform attestation file may be cryptographically bound to the authentication device 104 by signing the platform attestation file with the IDevID key or the AIK. In such an implementation of the platform attestation file, in some examples, authenticity of the platform attestation file may be established upon verifying the IDevID key or the AIK.

Moreover, in some examples, if the identity information read via the reader 304 conforms to the PCB ID stored in the platform certificate, it may be established that the PCB 102 is also genuine. It is to be noted that scope of the examples presented herein is not limited with reference to techniques of verifying the platform attestation file and the identity information. The platform attestation file may be verified by the user 308 by manually comparing the binding ID stored in the platform attestation file and/or by executing a verification software application on a computer system. Similarly, the identity information read via the reader 304 may be verified by the user 308 by manually checking to see if the identity information read via the reader 304 conforms to the PCB ID stored in the platform attestation file and/or by executing a verification software application on a computer system.

In certain examples, the reader 304 may include hardware and/or software that is capable of performing the verification of the platform attestation file and/or the identity information. In such an implementation of the reader 304, the reader 304 may display and/or communicate a message and/or provide an audio/visual indication to the user upon successful verification.

As will be appreciated, use of an embedded identification device (e.g., the identification device 114) within the PCB 102, storing the PCB ID in the platform attestation file that is cryptographically bound to the authentication device 104 imparts several advantages. In one example, it becomes difficult for anyone to gain access to the embedded identification device 114 without breaking/tampering the PCB 102 in which case one can easily detect, via mere visual inspection that the PCB 102 has been tampered with. Further, content (e.g., the identity information) stored in the identification device 114 cannot be altered as the memory portions storing the unique identifier of the identification device 114 and the derived identifier corresponding to the PCB are read-only memory portions. Furthermore, linking of the identity information with the digital identity by way of cryptographically binding the platform attestation file with the authentication device 104 facilitates a tamper evident and secure mechanism to establish an authenticity of the PCB 102 and/or the PCA 100. Any kind of digital or physical tampering of the identification device 114 and/or the authentication device 104 may lead to detecting a mis-compare, and indicating tampering with the PCB 102 or the PCA 100. In particular, unique identity traceability for the PCB 102 may be enabled all the way back to its fabrication.

Figure 4:
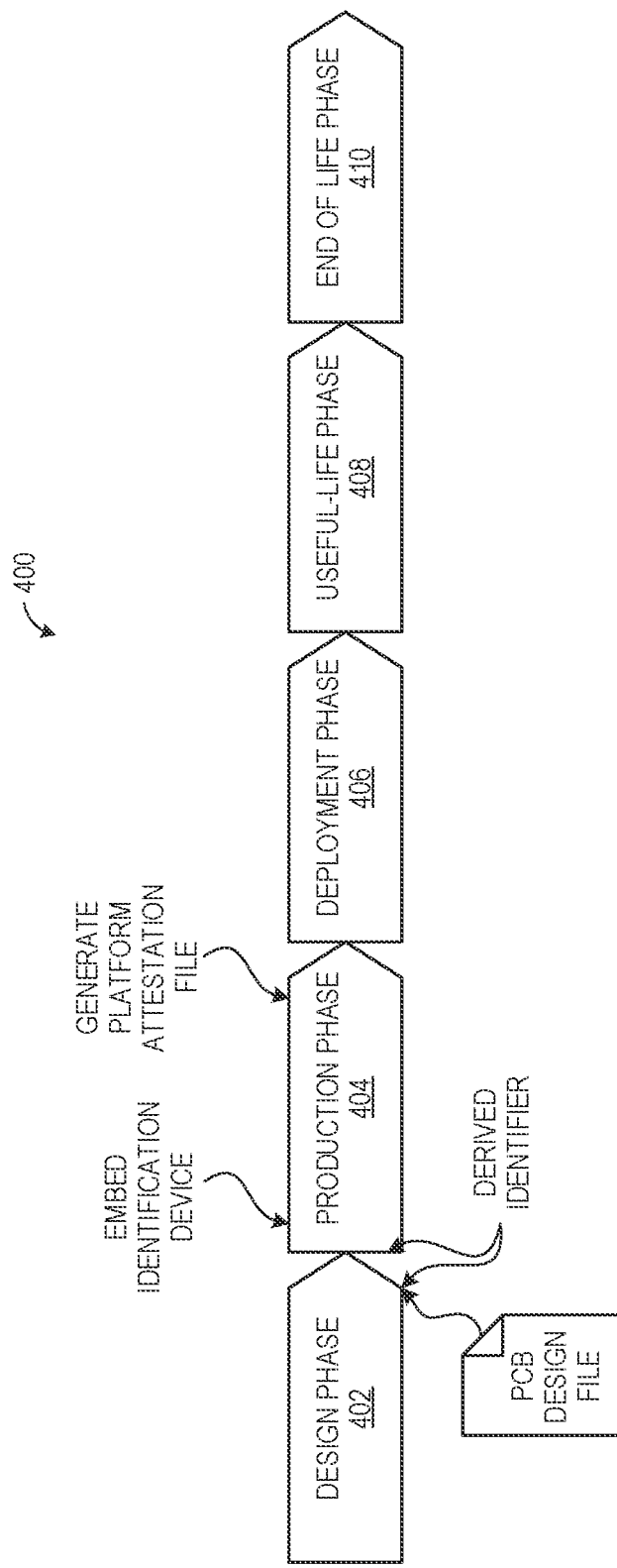
FIG. 4 depicts an example lifecycle of the PCA of FIG. 1, in accordance with an example.

Referring now to FIG. 4, an example lifecycle 400 of the PCA 100 of FIG. 1 is presented. As depicted in FIG. 4, in some examples, the lifecycle 400 of the PCA 100 may include a design phase 402, a production phase 404, a deployment phase 406, a useful life phase 408, and an end-of-life phase 410, sequentially over a period of time. During the design phase 402, a schematic of circuits to be disposed on the PCB 102 may be finalized and a layout of the electronic components 104-112 on the PCB 102 may be designed. Accordingly, at the end of the design phase 402, one or more PCB design files containing information about the schematic of circuits and layout of the electronic components 104-112 may have been created.

Further, in some examples, at the end of the design phase 402, at least a portion of the identity information to be stored in the identification device 114 may be determined. For example, the identity information may be defined based on a unique identifier (UID) associated with the identification device 114, a derived identifier (DID) associated with the PCB 102, or both the UID and the DID (described later). The UID may uniquely identify the identification device 114 and is stored in the identification device 114. In some examples, the UID may be a unique serial number of the identification device 114 which may be stored in the identification device 114 during manufacturing of the identification device 114. Further, in some examples, the DID associated with the PCB 102 may be generated based on one or more design parameters of the PCB 102. In particular, the DID associated with the PCB 102 may be generated by applying a cryptographic hash function on the PCB design files. The identity information including the UID and DID may be stored in the identification device 114 (see FIG. 6, for example).

Furthermore, in the production phase 404, the PCB 102 may be fabricated and the PCA 100 may be formed by installing the electronic components 104-112 on the PCB 102. In some examples, as soon as the PCB 102 is fabricated and before the electronic components 104-112 are disposed on the PCB 102, the identification device 114 may be embedded into the PCB 102. In certain examples, the identification device 114 may be embedded within the PCB 102 during the fabrication of the PCB 102 (e.g., when layers/or laminates of the PCB are stacked). Moreover, once the PCA 100 is formed at the end of the production phase 404, the platform attestation file may be generated. As previously noted, a PCB ID defined based on the identity information may also be stored in the platform attestation file. Moreover, the platform attestation file may be cryptographically bound to the authentication device 104 disposed on the PCB which establishes the digital identity of the PCA 100.

Moreover, in the deployment phase 406, the RCA 100 may be assembled into a finished product (e g., an electronic system 302). In some examples, the finished product may be disposed in a rack and/or installed on site and commissioned for field operation. During the useful life phase 408, the finished product may be expected to continue its operation on the site and may be inspected by an administrator or a service personnel time-time for ensuring proper functioning of the same including verification of the physical and digital identities. Once the useful life phase 408 has ended and/or the product gets damaged or malfunctions, the product may be securely destroyed in its end-of the life phase 410. Matching the actual physical identity of the PCB 102 with an expected physical identity during the act of physical destruction of the PCB 102 may ensure that the PCB 102 is not diverted to other purposes or harvested for the purposes of forensic data recovery by hostile actors.

Advantageously, as the PCB 102 is embedded with the identification device 114 and the identity information of which is secured with the platform attestation file in a tamper evident manner, a user (e.g., a customer, an administrator, or the service personnel) can also verify that the PCB 102 hosting the authentication device 104 is uncompromised all the way back to schematic capture during the design phase 402, by comparing the scanned or read identity information with the platform attestation file. This is achieved, in one example, by generating at least a portion of the identity information based on one or more design files of the PCB 102. Additionally, the scanned identity information can also be used to retrieve detailed production records and/or reference images of the genuine PCB from the remote server for further verification.

Figure 5:
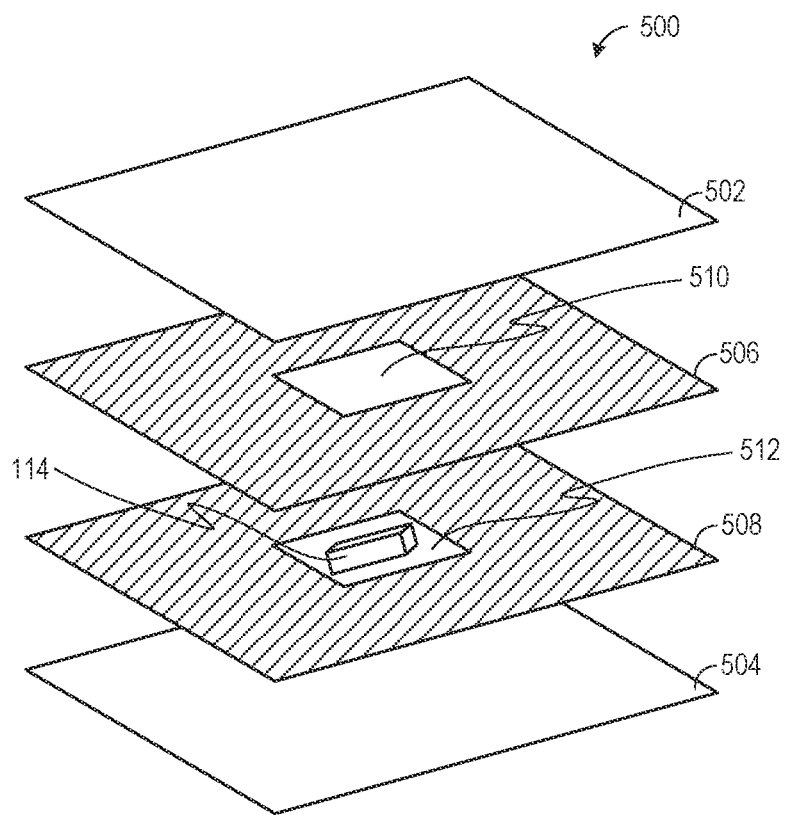
FIG. 5 depicts an exploded view of a portion of a printed circuit board (PCB) of the PCA of FIG. 1 where an identification device is embedded, in accordance with one example.

Referring now to FIG. 5, an exploded view 500 of a portion 101 of the PCB 102 FIG. 1 is presented where an identification device 114 is embedded, in accordance with one example. As depicted in FIG. 5, in some examples, the PCB 102 includes a plurality of layers (alternatively also referred as laminates) that are stacked. The plurality of layers may include a top layer 502, a bottom layer 504, and a plurality of intermediate layers 506, 508. The plurality of layers (e.g., the layers 502-508) may be formed using electrically non-conductive materials such as, but not limited to, one or more of FR-2, FR-4 epoxy laminate, polyimide, Teflon, or the like. In particular, the one or more intermediate layers of the plurality of intermediate layers 506, 508 may include openings. In the example of FIG. 5, both the intermediate layers 506, 508 are shown to include openings 510, 512, respectively. In some examples, the openings are aligned with each other so that the one or more intermediate layers 506, 508 when stacked between the top layer 502 and the bottom layer 504, define a cavity within the PCB 102. In some examples, the identification device 114 may be disposed in such cavity. In certain other example implementations, once the PCB 102 is fabricated, a hole may be formed (e.g., by way of drilling, milling, or routing) into the PCB 102 to form a cavity where the identification device 114 may be disposed.

Figure 6:
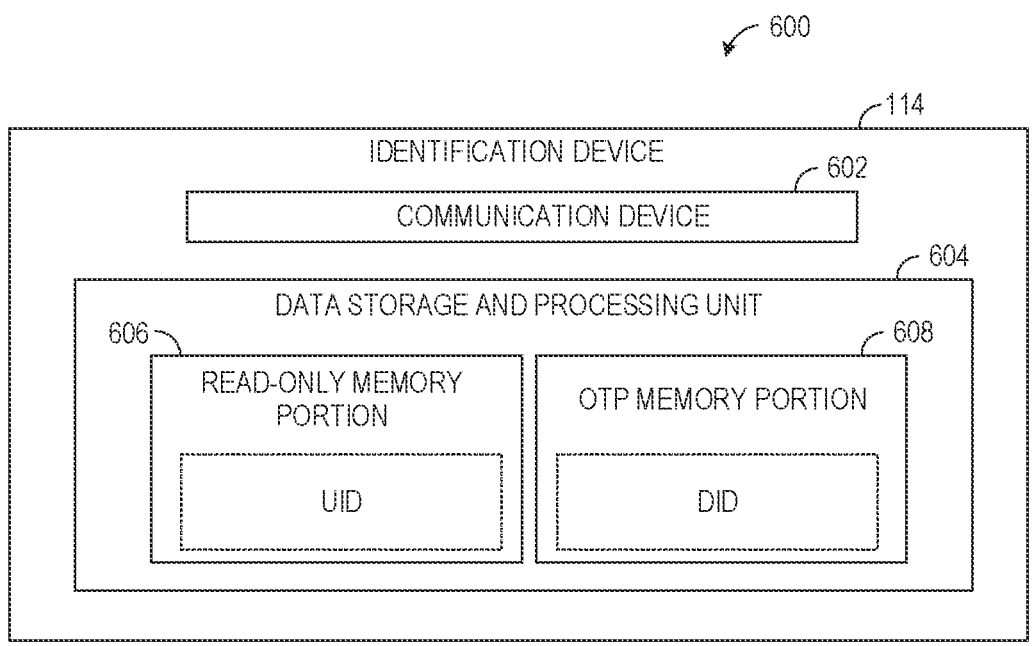
FIG. 6 depicts a block diagram of an identification device embedded in a PCB, in accordance with one example.

Turning now to FIG. 6, a block diagram 600 of the identification device 114 is depicted, in accordance with one example. For illustration purposes, the identification device 114 is described as being a passive RFID tag. However, the identification device 114 may also be implemented using other devices such as but not limited to, an active (e.g., battery operated) RFID tag, a memory element, an NFC device, or an IC chip with storage and communication capabilities. The identification device 114 may include a communication device 602, and a data storage and processing unit 604. The communication device 602 may include a communication medium such as an antenna that may be used to establish communication with external devices such as a reader (e.g., the reader 304).

Further, in some examples, the data storage and processing unit 604 may include a logic circuit (e.g., a microprocessor) that may make decisions and include memory to store data. A power required to operate the data storage and processing unit 604 may be obtained from a battery (e.g., in an active RFID tag) or in cases of the identification device 114 being a passive RFID tag, the power may be obtained from the radio energy radiated by the interrogator antenna of the reader or scanner. In some examples, the data storage and processing unit 604 may include one or more memory portions such as a read-only memory portion 606 and a onetime programmable (OTP) memory portion 608. The read-only memory portion 606 may be loaded, for example during the manufacturing of the identification device 114, with the UID (e.g., a unique serial number) that uniquely identifies the identification device 114. Moreover, in some examples, the DID that uniquely identifies the PCB 102 may be stored in the OTP memory portion 608. As previously noted, the DID may be generated based on the design files associated with the PCB 102. In some examples, the DID may be stored in the OTP memory portion 608 during the production phase 404 (see FIG. 4) or at the completion of the design phase 402. The OTP memory portion 608 once programmed cannot be reprogrammed or deleted. Once programmed, the OTP memory portion 608 may only be read. Advantageously, use of the OTP memory portion 608 enhances the security of the DID by ensuring that the DID once stored cannot be altered. The UID of the identification device 114 and the DID associated with the PCB 102 together define the identity information of the PCB 102.

In some examples, the PCB ID stored in the platform attestation file may be defined using the UID and the DID stored in the identification device 114. In some examples, the PCB ID may be a unique combination of the UID and the DID. For instance, the PCB ID may be obtained by concatenating the UID and the DID. For example, if the UID is 46516546 and the DID is 16546546, the identity information may be represented as 4651654616546546 (see FIG. 2). In some other examples, the PCB ID may represent a cryptographic hash value of the UID and the DID. It is to be noted that the present disclosure is not limited with respect to techniques to generate the PCB ID. Any suitable technique/algorithms may be executed to generate the PCB ID based on the UID and the DID.

Figure 7:
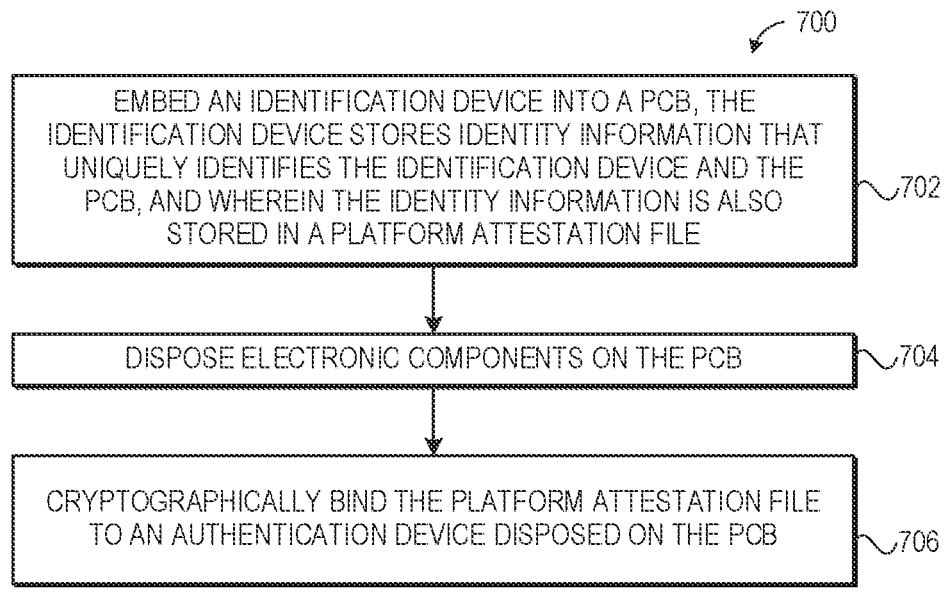
FIG. 7 is a flow diagram depicting a method for assembling the PCA of FIG. 1, in accordance with one example.

Moving to FIG. 7, a flow diagram depicting a method 700 for assembling the PCA 100 of FIG. 1 is presented, in accordance with one example. The method 700 is described in conjunction with FIGS. 1-6. At block 702, the identification device 114 may be embedded within the PCB 102 of the PCA 100. As previously illustrated, in some examples, the identification device 114 may be embedded within the PCB 102 by forming a hole in the PCB 102 and disposing the identification device 114 inside a cavity defined by the hole. In some other examples, the identification device 114 may be disposed within a cavity (e.g., the cavity) defined by the openings 510, 512 formed in the intermediate layers 506, 508 (see FIG. 5) when the intermediate layers 506, 508 are stacked as shown in FIG. 5. Further, at block 704, the electronic components such as one or more of the authentication device 104, the system controller 106, and the other electronic components 108-112 may be disposed on the PCB 102. The electronic components 104-112 may be permanently attached or removably attached to the PCB 102. In some examples, the identification device 114 stores identity information that uniquely identifies identification device 114 and the PCB 102. As previously described, the authentication device 104 establishes a unique digital identity of the PCA 100. Moreover, in some examples, a PCB ID defined based on the identity information may be stored in a platform attestation file (e.g., platform attestation file 200) hosted locally within the PCA 100 (e.g., in the system controller 106), on a remote server (e.g., the remote server 306), or both locally within the PCA and on the remote server.

Moreover, at block 706, the platform attestation file may be cryptographically bound to the authentication device 104 disposed on the PCB 102. In some examples, the platform attestation file may be cryptographically bound to the authentication device 104 by storing a serial number or other identifier of the private endorsement key certificate (e.g., the endorsement key certificate) of the authentication device 104. In this way, the identity information contained in the identification device 114 is also linked to a digital identity of the PCA 100.

Figure 8:
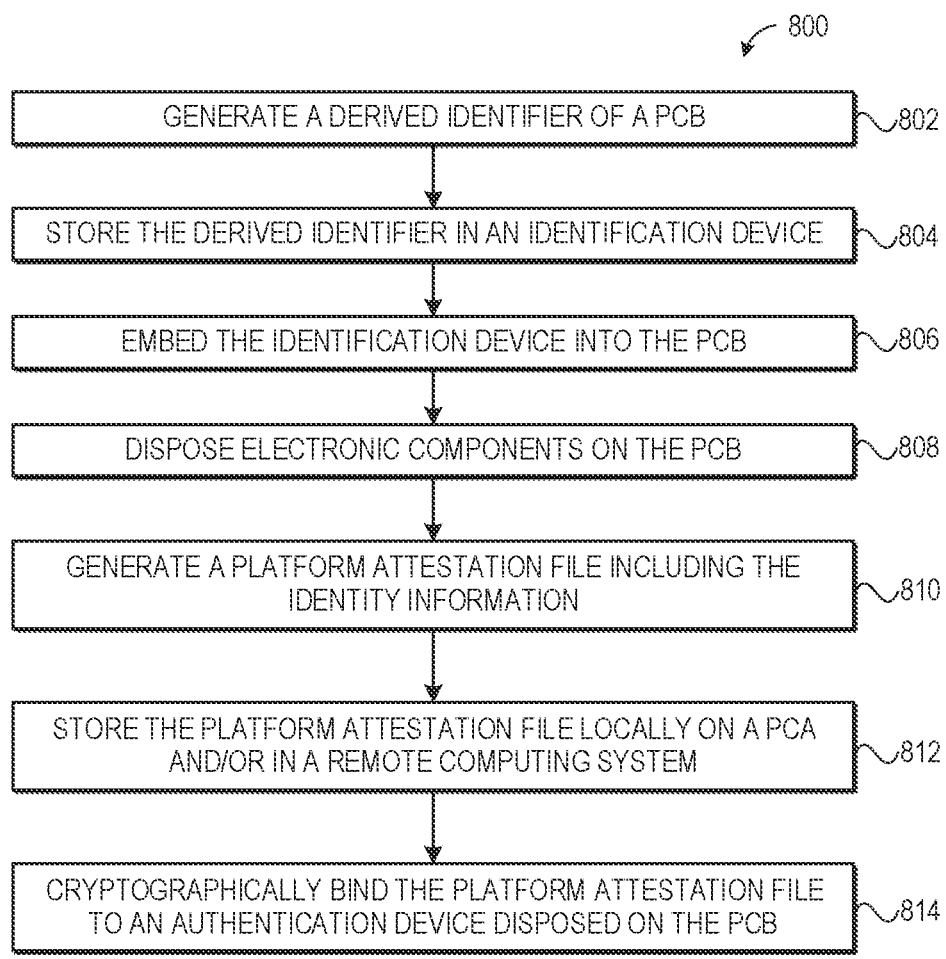
FIG. 8 is a flow diagram depicting a method for assembling the PCA of FIG. 1, in accordance with another example.

Turning now to FIG. 8, a flow diagram depicting a method 800 for assembling the PCA 100 of FIG. 1 is presented, in accordance with one example. The method 800 is described in conjunction with FIGS. 1-6 for reference.

At block 802, a DID corresponding to the PCB 102 is generated. In some examples, the DID may be generated based on one or more design files of the PCB 102 that are generated during the design phase 402 (see FIG. 4). In particular, in one example, the DID may be generated by applying cryptographic hash function to the design files of the PCB 102. In particular, in some examples, the DID may represent a cryptographic hash value of one or more design files of the PCB 102. In certain other examples, information in addition to the design files of the PCB 102 or any information other than the design files of the PCB 102 of the PCB may also be used to generate the DID that may uniquely identify the PCB 102.

Further, at block 804, the DID may be stored in the identification device 114. In some examples, the DID may be stored in the GTP memory portion 608 of the identification device 114. Further, in some examples, the identification device 114 may have already been loaded with the UID that uniquely identifies the identification device 114. The UID may be stored in the read-only memory portion 606 in the identification device 114. Furthermore, at block 806, the identification device 114 may be embedded into the PCB 102 (in a similar fashion as described in conjunction with block 702). The identification device 114 is uniquely recognized by the identity information that is defined by the unique identifier and the DID. Furthermore, at block 808, the electronic components such as one or more of the authentication device 104, the system controller 106, and the other electronic components 108-112 may be disposed on the PCB 102 (in a similar fashion as described in conjunction with block 706).

Moreover, at block 810, a platform attestation file (e.g., the platform attestation file) may be generated which include the identification information in the form of the PCB ID. In some examples, the platform attestation file may include several information fields including but not limited to, one or more of a product name of the PCA 100, a serial number of the PCA 100, a name of manufacturer of the PCA 100, or the PCB ID that is defined using the UID and the DID. Furthermore, in some examples, at block 812, the platform attestation file may be stored in the locally within the PCA 100 (e.g., in the system controller 106), on a remote server (e.g., the remote server 306), or both locally within the PCA 100 and on the remote server. Additionally, at block 814, the platform attestation file may be cryptographically bound to the authentication device 104 in a similar fashion as described in conjunction with block 706 of FIG. 7.

It is to be noted that, in FIGS. 7 and 8, a specific order of method blocks 702-706 and 802-814 is shown for illustration purpose only. Method blocks described in FIGS. 7 and 8 may be performed any suitable order, for example, in series (in the same order shown FIGS. 7-8 or in any different order), in parallel, in combination of series and parallel, without limiting the scope of the present disclosure.

As will be appreciated, use of an embedded identification device (e.g., the identification device 114) within the PCB 102, storing the PCB ID in the platform attestation file that is cryptographically bound to the authentication device 104 imparts several advantages. In one example, it becomes difficult for anyone to gain access to the embedded identification device 114 without breaking/tampering the PCB 102 in which case one can easily detect, via mere visual inspection that the PCB 102 has been tampered with. Further, the content (e.g., the identity information) stored in the identification device 114 cannot be altered as the memory portions storing the unique identifier of the identification device 114 and the derived identifier corresponding to the PCB are read-only memory portions. Furthermore, linking of the identity information with the digital identity of the authentication device 104 by way of cryptographically binding the platform attestation file with the authentication device 104 facilitates a tamper evident and secure mechanism to establish an authenticity of the PCB 102 and/or the RCA 100. Any kind of digital or physical tampering of the identification device 114 and/or the authentication device 104 may lead to detecting a mis-compare, and indicating tampering with the PCB 102 or the RCA 100. In particular, unique identity traceability for the PCB 102 may be enabled all the way back to its fabrication.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

Moreover, in the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A printed circuit assembly (PCA) comprising:
a printed circuit board (PCB);
an identification device embedded within the PCB, wherein the identification device stores identity information that uniquely identifies the identification device and the PCB, and wherein a PCB identifier (PCB ID) defined using the identity information is stored in a platform attestation file hosted locally within the PCA, on a remote server that is external to the PCA, or both locally within the PCA and on the remote server; and
an authentication device disposed on the PCB, wherein the platform attestation file is cryptographically bound to the authentication device.

2. The PCA of claim 1, wherein the identification device comprises one or more of a radio frequency identification (RFID) tag, a memory element, a near-field communication (NFC) device, or an integrated circuit (IC) chip.

3. The PCA of claim 1, wherein the authentication device is a security co-processor that is soldered on the PCB.

4. The PCA of claim 3, wherein the platform attestation file comprises a serial number of an endorsement key certificate corresponding to the security co-processor.

5. The PCA of claim 1, further comprising a baseboard management controller (BMC) disposed on the PCA, wherein the platform attestation file is stored in the BMC.

6. The PCA of claim 1, wherein the identity information comprises a unique identifier associated with the identification device, a derived identifier associated with the PCB, or both the unique identifier and the derived identifier.

7. The PCA of claim 6, wherein the identification device comprises:
   a read-only memory portion that stores the unique identifier associated with the identification device; and
   a one-time programmable memory portion that stores the derived identifier associated with the PCB.

8. The PCA of claim 6, wherein the derived identifier is generated based on one or more design parameters associated with the PCB.

9. The PCA of claim 6, wherein the derived identifier comprises a cryptographic hash value generated based on design files corresponding to the PCB.

10. The PCA of claim 1, wherein the platform attestation file further comprises additional identity data comprising one or more of a product name, a serial number, or a name of manufacturer.

11. The PCA of claim 1, wherein the remote server further stores an auxiliary identity data corresponding to the PCB, wherein in the auxiliary identity data comprises one or more of reference images, production records, component marking information, or production test results corresponding to a genuine PCB.

12. The PCA of claim 1, wherein the identity information comprises a first unique identifier identifying the identification device and a second unique identifier identifying the PCB.

13. A computing system comprising:
   a printed circuit assembly (PCA) comprising:
      a printed circuit board (PCB);
      an identification device embedded within the PCB, wherein the identification device stores identity information that uniquely identifies the identification device and the PCB, and wherein a PCB identifier defined using the identity information is stored in a platform attestation file hosted locally within the PCA, on a remote server separate from the PCA, or both locally within the PCA and on the remote server; and
      an authentication device disposed on the PCB, wherein the platform attestation file is cryptographically bound to the authentication device.

14. The computing system of claim 13, wherein the identification device is disposed in a cavity formed in the PCB.

15. The computing system of claim 14, wherein the PCB comprises a plurality of layers comprising a top layer, a bottom layer, and a plurality of intermediate layers, wherein one or more intermediate layers of the plurality of intermediate layers comprise openings, and wherein the one or more intermediate layers when stacked between the top layer and the bottom layer define the cavity within the PCB.

16. The computing system of claim 13, wherein the identity information comprises a first unique identifier identifying the identification device and a second unique identifier identifying the PCB.

17. A method comprising:
   embedding an identification device within a printed circuit board (PCB) of a printed circuit assembly (PCA);
   storing identity information that uniquely identifies the identification device and the PCB, wherein a PCB identifier defined using the identity information is stored in a platform attestation file hosted locally within the PCA, on a remote server external to the PCA, or both locally within the PCA and on the remote server; and
   cryptographically binding the platform attestation file to an authentication device disposed on the PCB.

18. The method of claim 17, wherein embedding the identification device comprises installing the identification device in a cavity formed within the PCB.

19. The method of claim 17, further comprising generating the platform attestation file comprising the identity information.

20. The method of claim 17, wherein the authentication device is a security co-processor, and wherein cryptographically binding the platform attestation file comprises storing a serial number of a private endorsement key certificate of the security co-processor into the platform attestation file.

21. The method of claim 17, further comprising using the authentication device to protect the PCA.

22. The method of claim 21, further comprising:
   generating a derived identifier based on design files corresponding to the PCB, wherein the storing comprises:
      storing the derived identifier into a one-time programmable memory portion of the identification device; and
      loading a unique identifier associated with the identification device into a read-only memory portion of the identification device.

* * * * *